March 3, 1953   B. BURWELL   2,630,369
METHOD FOR TREATING VANADIUM AND
URANIUM ORES AND THE LIKE
Filed March 19, 1949
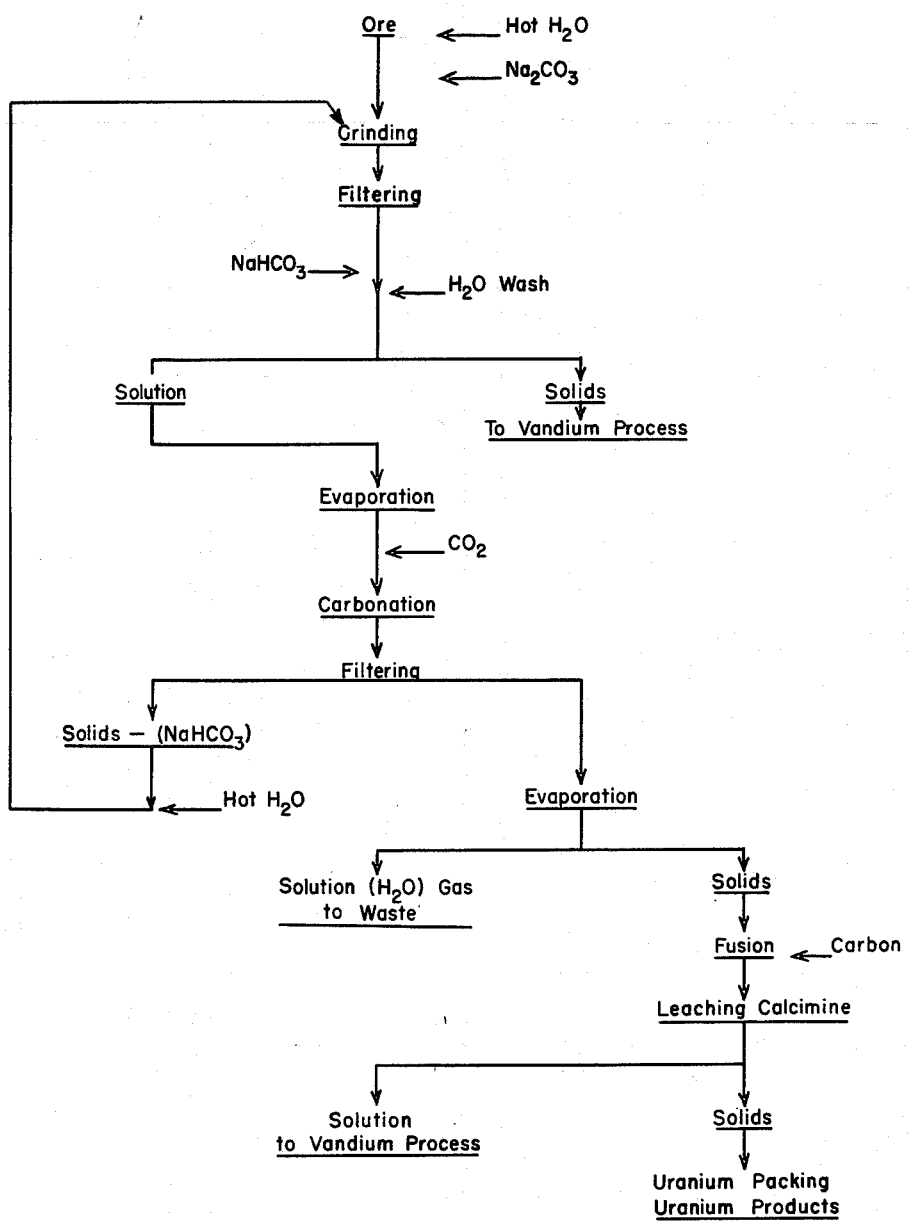
INVENTOR.
Blair Burwell
BY
ATTORNEY Patented Mar. 3, 1953

2,630,369

UNITED STATES PATENT OFFICE 2,630,369

METHOD FOR TREATING VANADIUM AND URANIUM ORES AND THE LIKE

Blair Burwell, Grand Junction, Colo., assignor to Climax Uranium Company, a corporation of Delaware Application March 19, 1949, Serial No. 82,487

8 Claims. (Cl. 23—14.5)

1

My invention is directed primarily to a process for treating ores, particularly those of vanadium and uranium.

In the western part of the United States, and particularly in the Colorado Plateau Region in Colorado and Utah, there is found an ore containing vanadium and uranium in which the mineral carnotite ($K_2O.2UO_3.V_2O_5.3H_2O$) occurs as a cementing material between sand grains in standstones or in combination with wood and fossil carbon masses in sedimentary beds. The ore is generally known as carnotite or roscoelite, although there are a great number of other minerals in the same ore which contain vanadium and uranium, such as tyuyamunite ($CaO.2UO_3.V_2O_5.2H_2O$)

vanoxite ($2V_2O_4.V_2O_5.8H_2O$), hewettite ($CaO.3V_2O_5.9H_2O$), as well as vanadiferous clays and hydrocarbons containing vanadium and uranium.

These complex ores are the most important American source of vanadium, having produced the largest part of American vanadium output during World War II, and are also the most important domestic source of uranium. In the past it has been difficult to work economically other than the richest of ores for uranium recovery because processes which were adapted to uranium recovery did not at the same time efficiently recover the vanadium values at a reasonable cost. The prior art processes for uranium recovery consist generally of boiling the ore with alkali carbonates to extract the uranium and soluble sulphates, separating the solution from the solids, treating the solution for the recovery of uranium, and treating the solids with a strong mineral acid, such as hydrochloric acid, for vanadium and radium extraction.

The effort to recover both vanadium and uranium from these ores by the process of boiling the crushed ore in an alkali carbonate solution, separating the solution containing dissolved metals from the solids, and precipitating the uranium contained in the solution by caustic soda and the vanadium by slaked lime, as described for example in Haynes et al. Patent No. 808,839, have not been commercially acceptable because:

1. The alkali carbonate solution did not extract more than from 10 to 15 per cent of the vanadium from the average ores; and 2. The uranium content of alkali carbonate solutions extracted from the ores can not be precipitated with sodium hydroxide without containing objectionable amounts of vanadium which precipitate with the uranium.

The average ores contain vanadium in a reduced valency and in association with hydrocarbons so that the amount of vanadium dissolved in a hot alkali carbonate solution is too low for economical treatment of ore.

This is illustrated by the following typical test:

A sample of uranium- and vanadium-bearing ore was taken from a large tonnage of representative mined ore produced in the Paradox Valley Region from a number of mines. This ore contained 1.87 per cent $V_2O_5$ and .27 per cent $U_3O_8$. The ore was crushed to minus 16 mesh size and treated by boiling with a strong sodium carbonate solution (20 per cent) for three hours. At the end of this time, the ore was filtered and washed, and the residue and separated solution were analyzed for vanadium and uranium content. The tablulation below gives the results:

| | Percent $V_2O_5$ | Percent $U_3O_8$ |
|---|---|---|
| Ore before treatment | 1.87 | .27 |
| Residue after treatment | 1.67 | .02 |
| Amount recovered in solution | 10.6 | 92.6 |

Obviously, the ores of vanadium and uranium can not be treated for the recovery of vanadium by simple boiling with alkali carbonate solutions, separating the solids, and precipitating the metals only. As the quantity of vanadium in the commercial carnotite ore exceeds the quantity of uranium by the ratio of approximately 10 of vanadium to 1 of uranium, the recovery of vanadium is required as well as that of uranium. It is the custom of the industry to treat these ores by roasting the crushed ores with salt which oxidizes the vanadium and converts a substantial amount of vanadium present to sodium vanadate. The sodium vanadate is then dissolved in water and can be thus separated from the solids and recovered. In this method of processing, the uranium is left in the residue or solids, and is recovered by treatment of the residues with strong acids which dissolve the uranium. The recovery of the uranium from the acid solution is involved and costly. The roasting treatment makes the uranium more difficult to dissolve by alkali carbonate leaching if lime salts are present in any substantial quantity in the ore due to the formation of calcium uranates in the roasting step.

In addition, the roasting of crude ground vanadium ore at high temperatures is expensive per pound of vanadium content because of the small amount of vanadium present, often 40 pounds per ton, in proportion to the large quantity of inert silica, which usually comprises from 80 to 85 per cent of the weight of the ore. Some method of concentration for the valuable ore minerals and elimination of waste material before roasting is desired. In processes for treating ore containing both uranium and vanadium, two separate plants are in effect required. The first is used to recover vanadium by salt roasting, and the second to recover the uranium in the residues by acid-leaching this material from the salt-roasting plant.

A primary object of my invention is, therefore, to provide a process which overcomes these and other objectionable characteristics of other processes, which a substantial portion of the major reagents may be recycled through the process, in which a greater percentage of the uranium is recovered and vanadium content of the ore is recovered at a substantially lower cost, and which may, if desired, be employed to obtain both vanadium and uranium as end product of the process.

Other objectives reside in various novel combinations of reagents, apparatus, and procedures as will be disclosed in the following detailed description of my process and in the appended drawing, in which the figure is a flow sheet of my improved process.

Carnotite or a similar ore containing uranium and vanadium is first ground to a suitable fineness, the degree of grinding preferably being sufficient to reduce the ore to about the size of the sand grains contained therein, which is usually adequate to substantially free the sand grains from the encrusting carnotite-impregnated material containing the uranium and vanadium values. A rod mill has been found to be satisfactory for this purpose, particularly if the ore is fed to the mill as a hot aqueous slurry containing an alkali metal carbonate, such as sodium carbonate ($Na_2CO_3$), the latter reagent assisting the grinding action by chemically softening and partially decomposing the cementing material.

The treatment of the ground ore with hot alkali carbonate solution assists the grinding of the ore by softening the fine, clay-like vanadium minerals which are encrusted on the silica grains and which enables the vanadium ore minerals to be cleanly separated and released from the coarser sand particles, thus enabling a fine, slime-like vanadium concentrate to be separated from the coarse and valueless silica. Whether or not the slurry is separated into a valuable vanadium-bearing slime concentrate and a coarse sand portion by classification at this stage of the treatment is not in all instances essential; and if desired, the digested ore may be filtered directly. However, in the stage of treatment after the digestion with alkali carbonate solution and during filtration, a small amount of alkali metal carbonate or bicarbonate is added to the slurry to assist in the dissolving of a small quantity of sodium diuranate which is formed by the boiling sodium carbonate solution.

I prefer to add a soluble alkali bicarbonate to the digested material after the digestion step and before the filtration step because temperatures at or near the boiling point remove carbon dioxide from the sodium carbonate solution and thus increase the amount of caustic soda in the alkaline solution by reason of the reaction:

$$Na_2CO_3 + Heat \rightarrow 2NaOH + CO_2$$

Uranium is rendered insoluble by sodium hydroxide, but is redissolved in cool bicarbonate solutions. Elevated temperatures near boiling are required to decompose the uranium-vanadium minerals; therefore, the best recovery of uranium is obtained by the use of alkali carbonate at or near the boiling point for the decomposition of the mineral, followed by the addition of alkali bicarbonate after digestion to supply carbon dioxide and so obtain the maximum recovery of uranium as the soluble sodium uranyl tricarbonate. There is usually enough bicarbonate in a solution resulting from dissolving commercial soda ash in water to supply the necessary $CO_2$ for maximum uranium recovery. If not, sodium bicarbonate can be supplied.

The resulting solution, separated from the solids by filtration or thickening, will contain from 85 to 98 per cent of the uranium and from 10 to 25 per cent of the vanadium originally present in the ore, together with the excess alkali metal carbonates and bicarbonates employed to decompose the ore. The solids may be retained for subsequent treatment to recover their residual vanadium content. The volume of the solution separated will depend upon the efficiency of the filtration or separation method used, but will usually approximate two-thirds of a ton per ton of ore treated, and will contain approximately 7.0 pounds of $U_3O_8$, 7 pounds of $V_2O_5$, 200 pounds of alkali carbonate as sodium carbonate and sodium bicarbonate in each ton of solution.

The solution is then treated to effect the recovery and reuse of excess alkali salts and the recovery of uranium. Processes hitherto used consisted of neutralizing the excess alkali carbonate with mineral acids, precipitating the vanadium content with ferrous sulphate, filtering the iron vanadate solids thus formed from the solution, and precipitating the uranium with an alkali hydroxide as insoluble sodium diuranate. In this method, however, the vanadium precipitate contains appreciable quantities of uranium, sometimes up to 2 per cent by weight and objectionable amounts of phosphorus which prevent its use without further complex processing. In the conventional method of treatment of the solution, large quantities of mineral acid are used to eliminate the carbonate present in the solution, and the solution is much diluted by filtering and washing.

My process of treatment of the solution is based upon conversion of the alkali carbonate present in the solution to alkali bicarbonate, based upon the reaction $$Na_2CO_3 + H_2O + CO_2 = 2NaHCO_3$$

and the fact that sodium bicarbonate is less soluble in water than sodium carbonate, while at the same time the solubility of uranium as sodium uranyl tricarbonate increases in the presence of excess $CO_2$ in sodium bicarbonate solution. This is illustrated by the following table:

| | | |
|---|---|---|
| 1. Temperature of solution _____°C__ | 20 | 30 |
| 2. Solubility of $Na_2CO_3$ in water, by weight of $Na_2CO_3$_____percent__ | 17.7 | 29.0 |
| 3. Solubility of $NaHCO_3$ in water, by weight of $NaHCO_3$_____percent__ | 8.8 | 10.0 |
| 4. Solubility of $NaHCO_3$ in water by weight of equivalent $Na_2CO_3$_____percent__ | 7.0 | 7.95 |
| 5. Solubility of $2Na_2CO_3 \cdot UO_2 \cdot CO_3$ in saturated sodium carbonate solution_____ | nil | nil |
| 6. Solubility of $2Na_2CO_3 \cdot CO_3 \cdot UO_2 \cdot CO_3$ in saturated sodium bicarbonate solution—weight of $U_3O_8$ _____percent__ | 3.0+ | ------ |

In the case of the average solution containing, for example, 200 pounds of sodium carbonate per ton, the conversion of all this sodium carbonate to bicarbonate would result in the removal of 60 pounds of sodium carbonate as bicarbonate, and the solution would contain the equivalent of 140 pounds of sodium carbonate. It is therefore advantageous to concentrate the solution by evaporation before the step of carbonating; but, as is apparent, the amount of evaporating effected is dependent upon the desire of the operator and the recovery of soda salts required. In general, the evaporation of the solution to a concentration of 25 per cent by weight of sodium carbonate content will enable the recovery of two-thirds of the sodium carbonate used in the solution.

Therefore, after the desired amount of evaporation, which can be carried out in either vacuum type evaporators or open pans, depending upon the desire of the operator, the solution is treated with gas containing carbon dioxide. This step can be carried out by any one of a number of machines or devices made for the carbonation of solutions, such as are used in the carbon dioxide industry.

The solids containing the insoluble alkali bicarbonate are separated by filtration from the solution or mother liquor containing the soluble uranium and vanadium. The quantity of alkali bicarbonate thus recovered will depend upon the degree of concentration of the filtrate during carbonation, and upon the concentration and pressure of the carbonating gas; but will, in general, average from 50 per cent to 80 per cent of the total amount of sodium carbonate present in the digesting solution. The recovered sodium carbonate and sodium bicarbonate may be added to the digested ore prior to classification or filtration and to the wash water for the filter, the remainder being combined with additional sodium carbonate for mixing with the ore in the grinding and digestion step.

The solution, from which the excess alkali bicarbonate has been separated, will contain a portion of the sodium bicarbonate and the soluble uranium and vanadium. This solution is then evaporated to dryness forming a mixture of soda salts, sodium vanadate ($Na_2V_2O_7$) and sodium uranyl tricarbonate ($Na_2CO_3 \cdot UO_2 \cdot CO_3$). These salts are heated in a calcining or fusion furnace, whereupon the sodium uranyl tricarbonate is converted to sodium diuranate ($Na_2U_2O_7$) upon the loss of $CO_2$. If desired, a small amount of carbon in suitable form, such as fine coke, sawdust, or charcoal can be added to form an insoluble reduced uranium oxide ($UO_2$). The temperature of this treatment must be sufficient to expell excess $CO_2$, temperatures form 600 to 900 degrees centigrade usually being sufficient to render the uranium salt insoluble. In this step, the vanadium is unaffected and remains as the water-soluble sodium vanadate.

The resulting mass is then leached with water, leaving a residue consisting principally of uranium salts of high purity, containing from 70 to 99 per cent by weight of uranium oxides (calculated as $U_3O_8$).

The leach water contains the residual vanadium in the form of sodium vanadate, substantially free of uranium. Usually the vanadium content of this liquor approximates from 10 per cent to 25 per cent of the vanadium present in the original ore, the remainder being found in the cake discharged from the first filter. The leaching water may therefore be treated to recover its vanadium by conventional methods, such as, for instance, by neutralization of the remaining alkali carbonate and hydroxide by mineral acid and boiling to precipitate an insoluble sodium vanadate compound.

It has been found that the filter cake, containing the vanadium value, is from three to five times richer in vanadium than is the original ore. More specifically, if the ore originally contained 40 pounds of $V_2O_5$ per ton, the total weight of the slimes obtained at the filter from the treatment of 2,000 pounds of original ore will be approximately 450 pounds; and will contain from 5 to 10 per cent $V_2O_5$, depending on the initial richness of the ore. Since the cost of treating vanadium ores in a roasting furnace with salt is usually approximately the same per ton regardless of the vanadium content, it is obvious that great economy can be effected in this operation by the treatment of the relatively rich concentrated fine slime, such as will be supplied from the process above described, in comparison with the treatment of the lower grade original ores.

Whether the classification of the digested ore into a rich vanadium slime portion and a relatively barren sand portion is done before the filtration of the alkali metal carbonate solution or afterward is not important and depends on the desire of the operator. This operation is of great value, if subsequent treatment of the ore residue for vanadium recovery is desired. If this is not the case, the residue can be discarded on the tailings piles for subsequent treatment.

As a more specific example of my process, fifteen pounds of carnotite ore containing 2.74 per cent $V_2O_5$ and .411 pound of $V_2O_5$ and .61 per cent and .091 pound of $U_3O_8$ were ground with 10 pounds of hot water, in which was dissolved 1.5 pounds of $Na_2CO_3$. After grinding to a size of minus 30 mesh, the slurry was heated with stirring at a temperature of 95 degrees for 1 hour; .10 pound of sodium bicarbonate was then added, and the slurry was filtered with wash waters containing 2 per cent of sodium bicarbonate. The filtrate, amounting to 11 pounds was then evaporated to 7 pounds, and furnace gas containing about 11 per cent $CO_2$ was bubbled through the solution with agitation for 1 hour. At the end, a gas of higher $CO_2$ content obtained by heating sodium bicarbonate from a previous run, was used to complete the conversion. As the sodium bicarbonate was precipitated, it was filtered from the solution. The resulting filtered solution was evaporated to dryness, producing .589 pound of salts, and was heated to 850° C. for 30 minutes with 5 grams of ground charcoal. The calcine was dissolved in 1 pound of water, and the residue was dried and assayed. It contained .085 pound $U_3O_8$ in a richness of 91 per cent $U_3O_8$. The extracting solution contained .305 pound of sodium carbonate and .041 pound of $V_2O_5$. This was treated with .291 pound of sulphuric acid, heated to boiling, and filtered. The precipitate contained .040 pound of $V_2O_5$ in a precipitate assaying 89 per cent $V_2O_5$.

The filtered slurry from the digestion step contained 2.46 per cent $V_2O_5$ and .03 per cent $U_3O_8$. This was classified and filtered, producing a slime cake weighing 3.4 pounds and assaying 8.98 per cent $V_2O_5$ and a sand portion weighing 11.51 pounds and assaying .63 per cent $V_2O_5$. The fines were roasted for two hours at a temperature of 815 degrees C., with 12 per cent of salt and 78 per cent of the vanadium contained recovered in a precipitate containing 88 per cent $V_2O_5$.

From the foregoing, it may be seen that I have provided a process which is not only highly economical in the use of reagents, but which is efficient in the extraction of either or both vanadium and uranium values from suitable ores.

Furthermore, my invention lends itself well to milling operations of both large and small capacity. For example, if the operation is small and the ore is quite rich, it may be possible to operate economically without recovering excess bicarbonate from the solution by treatment with $CO_2$ gas. While considerable sodium carbonate and bicarbonate is lost in such a treatment, the cost of equipment is markedly reduced and thus makes the process applicable to small operations. Even with this loss, it will be found that the cost of operation is lower than comparable prior art processes.

In a large plant, however, it will be most economical to reclaim the sodium carbonate and bicarbonate in solution by passing $CO_2$ gas into the solution, thus forming the bicarbonate and recycling the bicarbonate for use in the grinding, leaching, or washing treatments.

In compliance with R. S. 4888, I have described in detail a specific application of my process. I do not, however, thereby limit myself to the specific details described, except insofar as defined by the appended claims.

I claim:

1. The process for treating ores of uranium and vanadium which includes the steps of dissolving the uranium content of the ore by digestion in a hot aqueous solution of alkali metal carbonate, adding a salt selected from a class consisting of water-soluble carbonates and bicarbonates to the digested slurry, separating the solids from the resulting solution, passing $CO_2$ through the solution, separating the precipitated bicarbonate from said solution, evaporating the solution to form a residue, calcining the residue at a temperature sufficient to expel carbon dioxide, and then leaching the calcined mass with water to extract the vanadium compounds therefrom, whereby the uranium content of the ore is concentrated in insoluble form in the leached mass.

2. The process for treating ores of uranium and vanadium which includes the steps of dissolving the uranium content of the ore by digestion in a hot aqueous solution of alkali metal carbonate, adding a salt selected from a class consisting of water-soluble carbonates and bicarbonates to the digested slurry, separating the solids from the resulting solution, evaporating the solution to form a residue, calcining the residue at a temperature sufficient to expel carbon dioxide, and then leaching the calcined mass with water to extract the vanadium compounds therefrom, whereby the uranium content of the ore is concentrated in insoluble form in the leached mass.

3. The process for treating ores of uranium and vanadium which includes the steps of dissolving the uranium content of the ore by digestion in a hot aqueous solution of alkali metal carbonate, adding a salt selected from a class consisting of water-soluble carbonates and bicarbonates to the digested slurry, separating the solids from the resulting solution, passing $CO_2$ through the solution, separating the precipitated bicarbonate from said solution, evaporating the solution to form a residue, calcining the residue with carbon at a temperature sufficient to expel carbon dioxide, and then leaching the calcined mass with water to extract the vanadium compounds therefrom, whereby the uranium content of the ore is concentrated in insoluble form in the leached mass.

4. The process for treating ores of uranium and vanadium which includes the steps of dissolving the uranium content of the ore by digestion in a hot aqueous solution of alkali metal carbonate, adding a salt selected from a class consisting of water-soluble carbonates and bicarbonates to the digested slurry, separating the solids from the resulting solution, passing $CO_2$ through the solution, separating the precipitated bicarbonate from said solution, evaporating the solution to form a residue, calcining the residue with carbon at a temperature sufficient to expel carbon dioxide, leaching the calcined residue with water to extract the soluble vanadium compounds therein, and treating the undigested solids and leaching water for the recovery of vanadium, whereby the uranium remains as an insoluble compound in said residue.

5. The process for treating ores of uranium which includes the steps of dissolving the uranium and vanadium content of the ore by digestion in a hot aqueous solution of sodium carbonate, adding to the resulting slurry a salt selected from a class consisting of carbonates and bicarbonates, separating the solids from the solution, classifying said solids to extract the fines therefrom, partially evaporating said solution, passing carbon dioxide gas through the partially evaporated solution to precipitate bicarbonates therefrom, separating the precipitated bicarbonate from said solution, evaporating the solution to dryness, calcining the resulting solids at a temperature in excess of 600° C. to expel carbon dioxide, leaching the calcined residue, treating the fines and solution for the recovery of vanadium, the uranium values being concentrated in the leached residue.

6. The process for treating ores of uranium which includes the steps of dissolving the uranium and vanadium content of the ore by digestion in a hot aqueous solution of sodium carbonate, adding to the resulting slurry a salt selected from a class consisting of carbonates and bicarbonates, separating the solids from the solution, classifying said solids to extract the fines therefrom, partially evaporating said solution, passing carbon dioxide gas through the partially evaporated solution to precipitate bicarbonates therefrom, separating the precipitated bicarbonate from said solution, evaporating the solution to dryness, calcining the resulting solids with $CO_2$ at a temperature in excess of 600° C. to expel carbon dioxide, leaching the calcined residue, treating the fines and solution for the recovery of vanadium, the uranium values being concentrated in the leached residue.

7. The process for treating ores of uranium and vanadium which includes the steps of dissolving the uranium and vanadium content of the ore by digestion in a hot aqueous solution of alkali metal carbonate, adding a salt selected from a class consisting of water-soluble carbonates and bicarbonates to the digested slurry, separating the solids from the solution, passing $CO_2$ through the solution, separating the precipitated bicarbonates from said solution, recycling the precipitated bicarbonates, evaporating the solution to form a residue, calcining the residue at a temperature sufficient to expel carbon dioxide, and then leaching the calcined residue with water to extract the vanadium compounds therefrom, whereby the uranium content of the ore is concentrated in insoluble form in the leached residue.

8. The process for treating ore containing uranium and vanadium which comprises the steps of digesting ground ore in a hot alkali metal carbonate solution, adding to the slurry after digestion a salt selected from a class consisting of alkali metal carbonates and bicarbonates, separating the solids from the solution, washing the solids with water containing a salt selected from said class, treating the solids by classification to separate the coarse particles from the fine, treating the fines for the recovery of vanadium, evaporating the solution from the digested ore to dryness, heating the residue with carbon to a temperature sufficient to expel carbon dioxide, leaching the calcined mass with water, and extracting vanadium from the resultant leaching water, said uranium being contained in the leached residue.

BLAIR BURWELL.

No references cited.